US006826288B2

(12) United States Patent
Gamberini

(10) Patent No.: US 6,826,288 B2
(45) Date of Patent: Nov. 30, 2004

(54) SUPPORT FOR EARPHONE UNIT FOR A SCUBA DIVER MASK

(75) Inventor: Sergio Gamberini, Genoa (IT)

(73) Assignee: Mestel S.r.l., Genoa (IT)

( * ) Notice: Subject to any disclaimer, the term of this patent is extended or adjusted under 35 U.S.C. 154(b) by 13 days.

(21) Appl. No.: 10/234,642

(22) Filed: Sep. 4, 2002

(65) Prior Publication Data
US 2003/0068026 A1 Apr. 10, 2003

(30) Foreign Application Priority Data

Sep. 4, 2001 (IT) .................................. MI2001A1862

(51) Int. Cl.[7] .............................................. H04R 25/00
(52) U.S. Cl. ...................................... 381/379; 311/334
(58) Field of Search ................................ 381/370, 374, 381/376, 377, 379, 334; 379/175, 58; 455/90, 351, 575, 95, 87; 2/428

(56) References Cited

FOREIGN PATENT DOCUMENTS

WO     WO 00/72629     * 11/2000

* cited by examiner

*Primary Examiner*—Sinh Tran
(74) *Attorney, Agent, or Firm*—Hedman & Costigan, P.C.

(57) ABSTRACT

A support for earphone unit for a scuba diver mask (18) comprises a U-shaped base (20) with a rod (21) extending from it, associable to an earphone unit (12), to be arranged close to the scuba diver's ear, wherein the U-shaped base (20) in each of its two legs (23) can be attached to a carrying band (14) of the mask (11) by freely removable coupling means (24, 25) and a free end of the rod (21) is arranged into a seat (30) of the earphone unit (12).

4 Claims, 3 Drawing Sheets

SUPPORT FOR EARPHONE UNIT FOR A SCUBA DIVER MASK

The present invention relates to a support for earphone unit for scuba diver masks.

The masks used in the field of scuba diving activities are provided with both a microphone and an earphone unit with relevant accessory members, both for communication between scuba divers and for communication with a ground or ship base.

To this purpose, the mask must be provided with a microphone and an earphone unit, which should be easy to place and as much easy to use.

At present, these accessories, in particular the earphone unit, are arranged on straps or thongs used to arrange and keep the mask on the scuba diver's face.

Such arrangement implies problems for arranging the entire mask, and discomfort for the diver, due to pressures onto the parts of the face stressed by the strap and/or by the earphone unit.

Moreover, adjusting the strap is inaccurate and difficult, also due to the earphone unit weighing onto it.

Object of the present invention is to realise a support for earphone unit for a scuba diver mask, which should solve the above technical problems, allowing a quick and easy placing.

Another object is to realise a support for earphone unit for a scuba diver mask, which should exhibit a great versatility of arrangement, allowing the adaptation of the position according to the particular arrangement of the mask made by the scuba diver.

These objects according to the present invention are achieved by realising a support for earphone unit for a scuba diver mask according to claim 1.

Further features of the invention are described in the following claims.

The features and the advantages of a support for earphone unit for scuba diver masks according to the present invention will appear more clearly from the following exemplifying and non-limiting description, made with reference to the attached schematic drawings.

Figure 1:
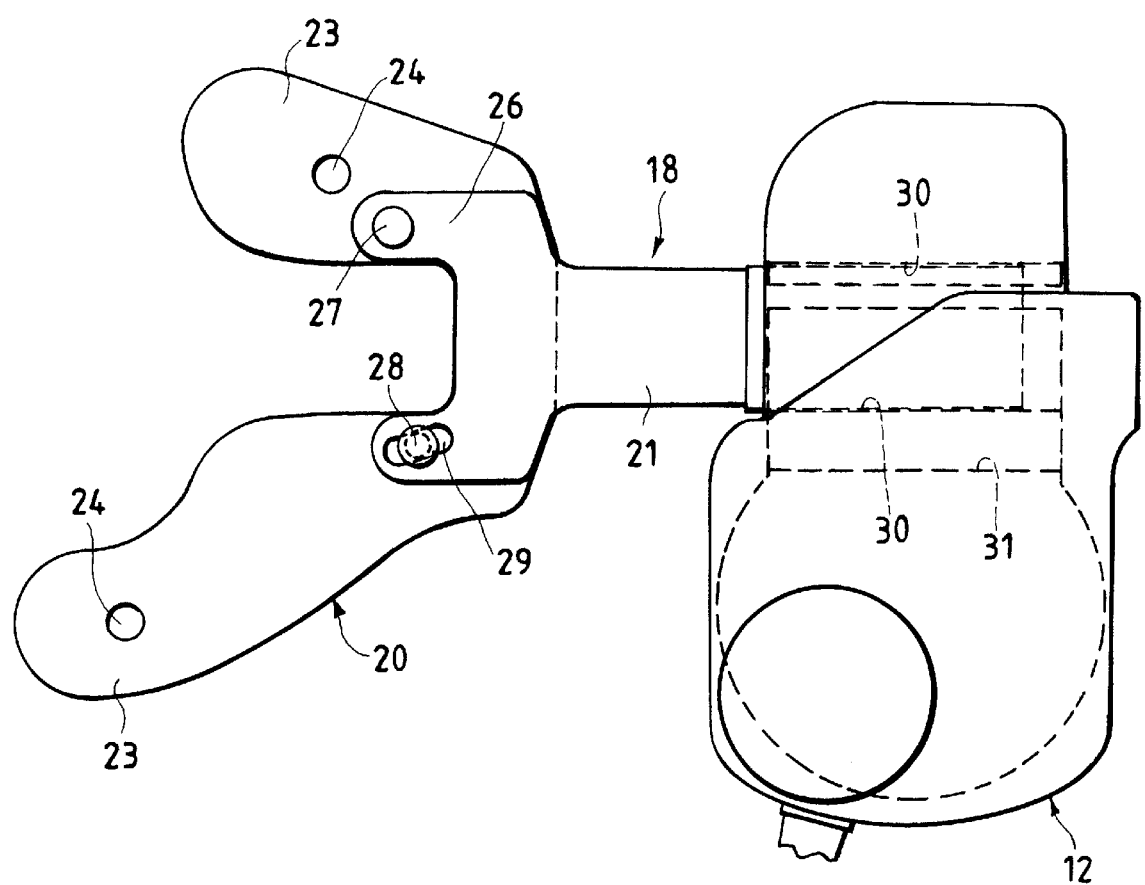
FIG. 1 is a side view of a support according to the invention, with an earphone arranged thereon.

With reference to the drawings, there is shown a support for earphone unit for a scuba diver mask, realised according to the present invention.

A mask for scuba divers, partly indicated with reference numeral 11, is provided with a microphone (not shown) and with an earphone unit, schematised in reference numeral 12, arrangeable at at least one of the scuba diver's ears, not shown.

Mask 11 comprises a carrying structure 13 provided with a carrying band 14 at which a glass 15 is arranged, which allows the scuba diver' to see.

The carrying band 14 is provided with seats 16 housing ends of straps 17 for holding mask 11 onto the scuba diver's face.

According to the present invention, a support for earphone unit 12 is realised, globally indicated with reference numeral 18, for the above mask 11 for scuba divers.

Support 18 comprises a U-shaped base 20 with a rod 21 extending from it, associable to the earphone unit, schematised in reference numeral 12, to be arranged close to the scuba diver's ear.

In the example shown, on each of two legs 23 the U-shaped base 20 is provided with a hole 24, suitable for receiving and locking snap-wise an embossment or extension 25 obtained on the carrying band 14 of mask 11, thereby forming freely removable coupling means. Rod 21 is made integral with the central portion of the U-shaped base 20 by an end 26, U-shaped as well, facing the same direction as the U-shaped base 20.

In particular, the constraint between them is realised through pins 27 and 28, one of which is fixed while the other one is arranged into a slot 29, which also allows a rotation of rod 21 relative to the U-shaped base 20.

Moreover, strap 17 is provided with an adjustment 22 extending outwards and actuable by the scuba diver. Such adjustment 22 of strap 17 arranges itself in the central portion of the U-shaped base 20 and of rod 21, thereby collaborating to keep support 18.

Rod 21 may be realised into two parts, a first one axially movable relative to the other one, thanks to the presence of a ring nut-slot constraint, not shown, thereby allowing an axial adjustment of the parts.

The free end of rod 21 fits into a seat 30 obtained laterally on a face of the earphone unit 12. In the example, the free end of rod 21 can be arranged since seat 30 is not closed and elastically acts on the same end, allowing it to quickly and firmly arrange into itself.

Moreover, a recess 31 is obtained in an intermediate portion of the earphone unit 12, suitable for receiving thorough-wise a strap 17 of mask 11.

Figure 2:
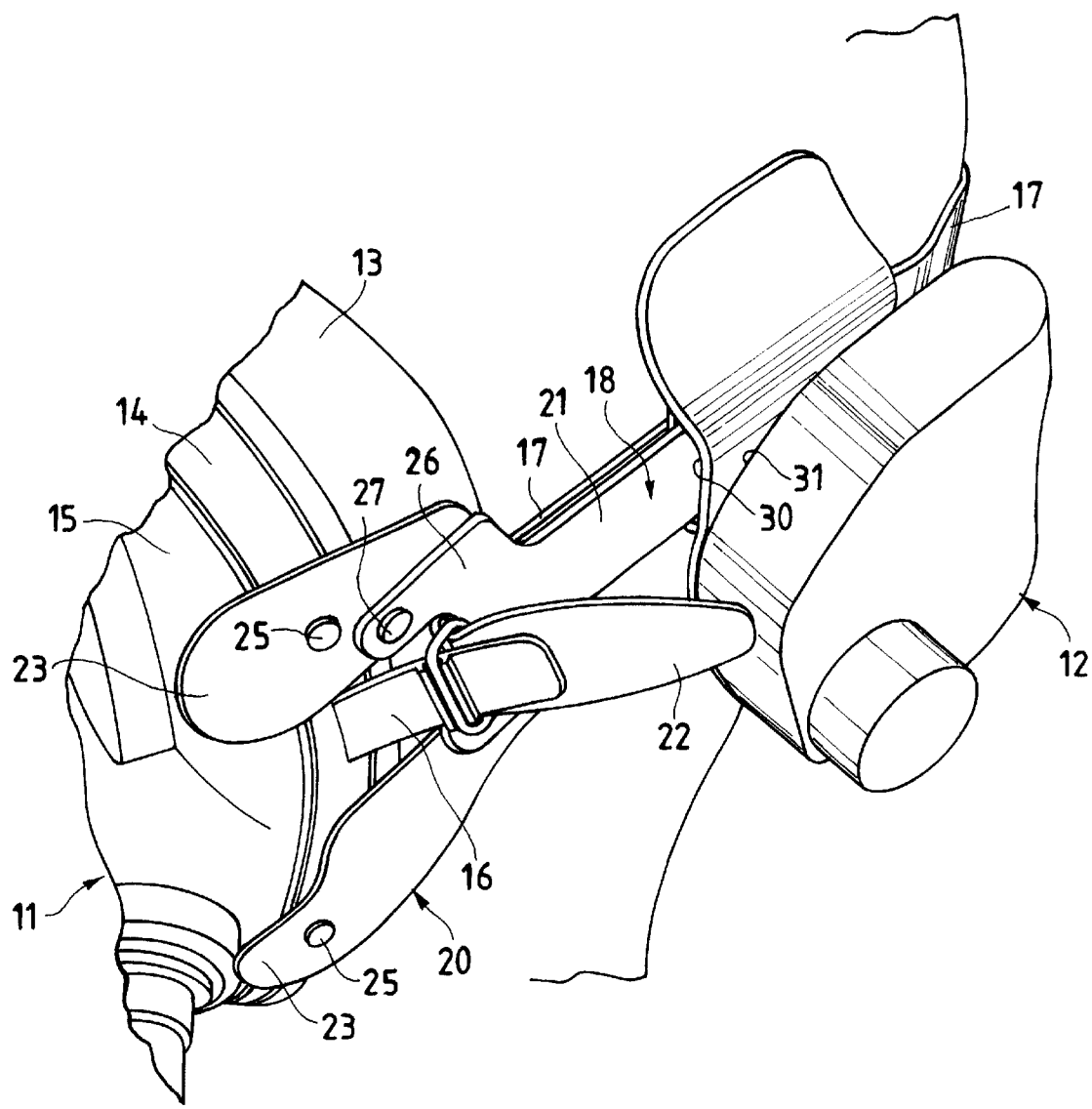
FIG. 2 is a side view of a support according to the invention, when arranged onto a mask, only partly shown, in a first possible position on a scuba diver's face.

In a first arrangement of mask 11 provided with a support 18 according to the invention, shown in FIG. 2, such mask 11 is first of all placed onto the face with strap 17 arranged around the head.

Support 18, carrying the earphone unit 12, is then associated to the carrying band 14 by arranging holes 24, obtained on its ends, one at a time onto the two embossments 25 integral with band 14.

In particular, once the upper hole 24 has been arranged into the respective upper embossment 25, adjustment 22 is moved to the central portion of the U-shaped base 20 and of rod 21 so that such adjustment superimposes upon the support. Then, the second hole 24 is moved upon the second embossment 25.

Such arrangement collaborates to properly keeping support 18 into position thanks to the pressure exerted by seat 16 of the mask for housing strap 17, and by adjustment 22 against the central portion of the U-shaped base 20 and of rod 21, even though a prolonged pressure of the earphone unit 12 on the scuba diver's ear is avoided.

Figure 3:
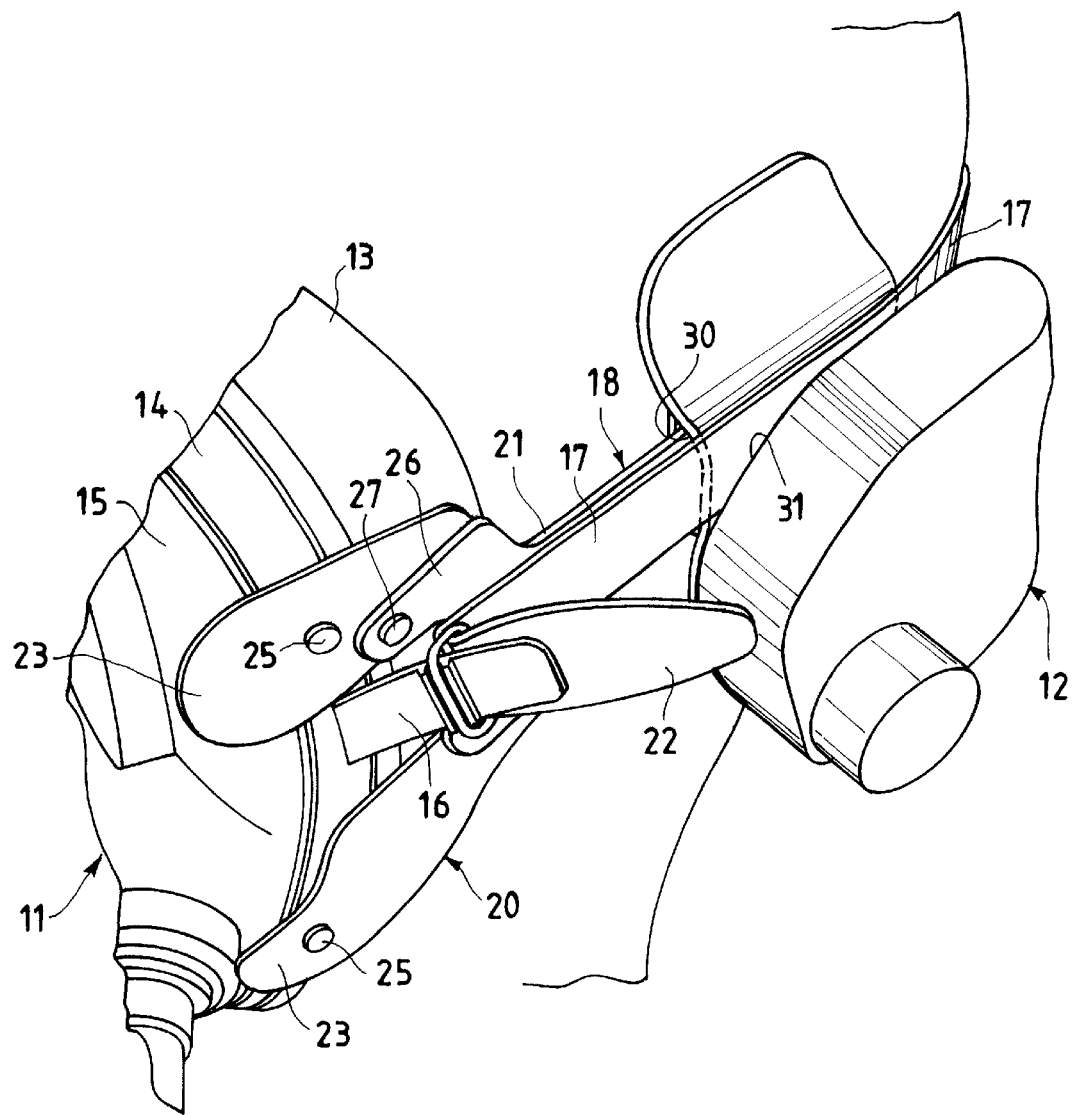
FIG. 3 is a side view of a support according to the invention, when arranged onto a mask, only partly shown, in a second possible position on a scuba diver's face.

The second arrangement shown in FIG. 3 shows how, with mask on, support 18 is arranged under strap 17.

In particular, strap 17 fits into recess 31 obtained in the earphone unit 12 and in this way, it collaborates to properly keeping the earphone unit into operating position, contributing to pressing it close to the ear. In that case, after hooking holes 24 into the respective embossments 25, fitting the U-shaped base 20 under strap 17, adjustment 22 of strap 17 is regulated to fully adapt the mask to the scuba diver's face.

It has been proved that a support for earphone unit for a scuba diver mask according to the present invention achieves the aforementioned objects.

In particular, the strap can be advantageously adjusted more accurately since the strap is not used to support the weight of the earphone unit.

Moreover, the use of a support for earphone unit for a scuba diver mask, object of the present invention, allows an easier application of the straps around the scuba diver's head, considerably simplifying the operation of wearing the mask.

The support for earphone unit for a scuba diver mask of the present invention, thus conceived, can be subject to several changes and variants, all falling within the same inventive concept.

Moreover, in the practice, the materials used, as well as their sizes and components, may be of any type according to the technical requirements.

What is claimed is:

1. Support for earphone unit for a scuba diver mask (18), comprising a U-shaped base (20) with a rod (21) extending from said base, which is associated with an earphone unit (12), that is adapted to be arranged close to the scuba diver's ear, said U-shaped base (20) having two legs (23) which are attachable to a carrying band (14) of said mask (11) by freely removable coupling means (24, 25), a free end of said rod (21) being arranged into a seat (30) of said ear unit (12) wherein said freely removable coupling means consist of a hole (24) in each of said two legs (23) of said U-shaped base (20) which extends into an extension (25) on said carrying band (14) of the mask (11) which is suitable for engaging snap-wise (3), said U-shaped base (20) and said rod (21) being two separate parts connected by pins (27, 28), said pins (27, 28) being connected to an end (26) of said rod (21), which is U-shaped and faces the same direction as said U-shaped base (20).

2. Support (18) according to claim 1 wherein pin (27) is fixed and the other pin (28) is arranged into a slot (29) that allows a rotation of said rod (21) relative to the U-shaped base (20).

3. Support (18) according to claim 1, wherein a central portion of said U-shape base (20) and of said rod (21) houses an adjustable end (22) of a strap (17) which extends outwards.

4. Support (18) according to claim 1, wherein said rod (21) has two parts, one of which is axially movable relative to the other one, through a ring nut-slot constraint.

* * * * *